(12) United States Patent
Lim et al.

(10) Patent No.: US 12,238,319 B2
(45) Date of Patent: Feb. 25, 2025

(54) IMAGE ENCODING/DECODING METHOD AND DEVICE, AND RECORDING MEDIUM STORING BITSTREAM

(71) Applicant: Electronics and Telecommunications Research Institute, Daejeon (KR)

(72) Inventors: Woong Lim, Daejeon (KR); Gun Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 141 days.

(21) Appl. No.: 17/614,497

(22) PCT Filed: Sep. 22, 2020

(86) PCT No.: PCT/KR2020/012768
§ 371 (c)(1),
(2) Date: Nov. 26, 2021

(87) PCT Pub. No.: WO2021/060801
PCT Pub. Date: Apr. 1, 2021

(65) Prior Publication Data
US 2022/0224932 A1    Jul. 14, 2022

(30) Foreign Application Priority Data

Sep. 23, 2019 (KR) .......... 10-2019-0116800
Sep. 26, 2019 (KR) .......... 10-2019-0118875

(51) Int. Cl.
*H04N 19/46* (2014.01)
*H04N 19/169* (2014.01)
(Continued)

(52) U.S. Cl.
CPC .......... *H04N 19/46* (2014.11); *H04N 19/176* (2014.11); *H04N 19/1883* (2014.11); *H04N 19/82* (2014.11)

(58) Field of Classification Search
None
See application file for complete search history.

(56) References Cited

U.S. PATENT DOCUMENTS

| 2013/0188738 A1 | 7/2013 | Hannuksela et al. | |
| 2013/0202051 A1* | 8/2013 | Zhou .................... | H04N 19/521 375/240.26 |

(Continued)

FOREIGN PATENT DOCUMENTS

| CN | 104756495 A | 7/2015 |
| CN | 105075266 A | 11/2015 |

(Continued)

OTHER PUBLICATIONS

Benjamin Bross et al., Versatile Video Coding (Draft 6), JVET-O2001-vE, Joint Video Experts Team (JVET) of ITU-T SG 16 WP 3 and ISO/IEC JTC 1/SC 29/WG 11, 15th Meeting: Gothenburg, SE, Jul. 3-12, 2019.

(Continued)

*Primary Examiner* — Dave Czekaj
*Assistant Examiner* — Shanika M Brumfield
(74) *Attorney, Agent, or Firm* — BROADVIEW IP LAW, PC

(57) ABSTRACT

The present invention relates to a video decoding method, the video decoding method according to an embodiment of the present invention comprises, obtaining sub-picture information of a current sub-picture through at least one signaling level and decoding the current sub-picture using the sub-picture information, wherein the sub-picture information is obtained for each decoded sub-picture.

7 Claims, 9 Drawing Sheets

(51) Int. Cl.
*H04N 19/176* (2014.01)
*H04N 19/82* (2014.01)

(56) References Cited

U.S. PATENT DOCUMENTS

| | | |
|---|---|---|
| 2014/0169448 A1 | 6/2014 | Wang |
| 2014/0286416 A1 | 9/2014 | Jeon et al. |
| 2016/0134879 A1 | 5/2016 | Choi et al. |
| 2019/0037216 A1 | 1/2019 | Cho |
| 2019/0082178 A1 | 3/2019 | Kim et al. |
| 2021/0409785 A1* | 12/2021 | Wang .................. H04N 19/169 |

FOREIGN PATENT DOCUMENTS

| | | | |
|---|---|---|---|
| CN | 107925759 A | 4/2018 | |
| KR | 1020130043054 A | 4/2013 | |
| KR | 1020130105214 A | 9/2013 | |
| KR | 1020180033030 A | 4/2018 | |
| KR | 1020180101123 A | 9/2018 | |
| WO | WO-2021035225 A1 * | 2/2021 | .......... H04N 19/157 |

OTHER PUBLICATIONS

Jill Boyce et al., Sub-pictures and sub-picture sets with level derivation, JVET-O0555-v1, Joint Video Experts Team (JVET) of ITU-T SG 16 WP 3 and ISO/IEC JTC 1/SC 29/WG 11, 15th Meeting: Gothenburg, SE, Jul. 3-12, 2019.

Yong He et al., AHG12: On picture and sub-picture signaling, JVET-O0182r1, Joint Video Experts Team (JVET) of ITU-T SG 16 WP 3 and ISO/IEC JTC 1/SC 29/WG 11, 15th Meeting: Gothenburg, SE, Jul. 3-12, 2019.

* cited by examiner

FIG.5

| seq_parameter_set_rbsp( ) { | Descriptor |
|---|---|
| ... | |
| pic_width_max_in_luma_samples | ue(v) |
| pic_height_max_in_luma_samples | ue(v) |
| subpics_present_flag | u(1) |
| if( subpics_present_flag ) { | |
|    max_subpics_minus1 | u(8) |
|    subpic_grid_col_width_minus1 | u(v) |
|    subpic_grid_row_height_minus1 | u(v) |
|    for( i = 0; i < NumSubPicGridRows; i++ ) | |
|      for( j = 0; j < NumSubPicGridCols; j++ ) | |
|        subpic_grid_idx[ i ][ j ] | u(v) |
|    for( i = 0; i <= NumSubPics; i++ ) { | |
|      subpic_treated_as_pic_flag[ i ] | u(1) |
|      loop_filter_across_subpic_enabled_flag[ i ] | u(1) |
|    } | |
| } | |
| ... | |
| log2_ctu_size_minus5 | u(2) |
| ... | |
| } | |

FIG.6

```
The variables SubPicTop[ subpic_grid_idx[ i ][ j ] ], SubPicLeft[ subpic_grid_idx[ i ][ j ] ],
SubPicWidth[ subpic_grid_idx[ i ][ j ] ], SubPicHeight[ subpic_grid_idx[ i ][ j ] ], and NumSubPics are derived
as follows:
NumSubPics = 0
for( i = 0; i < NumSubPicGridRows; i++ ) {
    for( j = 0; j < NumSubPicGridCols; j++ ) {
        if ( i = = 0)
            SubPicTop[ subpic_grid_idx[ i ][ j ] ] = 0
        else if( subpic_grid_idx[ i ][ j ] != subpic_grid_idx[ i - 1 ][ j ] ) {
            SubPicTop[ subpic_grid_idx[ i ][ j ] ] = i
            SubPicHeight[ subpic_grid_idx[ i - 1 ][ j ] ] = i - SubPicTop[ subpic_grid_idx[ i - 1 ][ j ] ]
        }
        if ( j = = 0)
            SubPicLeft[ subpic_grid_idx[ i ][ j ] ] = 0
        else if (subpic_grid_idx[ i ][ j ] != subpic_grid_idx[ i ][ j - 1 ]) {
            SubPicLeft[ subpic_grid_idx[ i ][ j ] ] = j
            SubPicWidth[ subpic_grid_idx[ i ][ j ] ] = j - SubPicLeft[ subpic_grid_idx[ i ][ j - 1 ] ]
        }
        if ( i = = NumSubPicGridRows - 1)
            SubPicHeight[ subpic_grid_idx[ i ][ j ] ] = i - SubPicTop[ subpic_grid_idx[ i - 1 ][ j ] ] + 1 if (j = = NumSubPicGridRows - 1)
            SubPicWidth[ subpic_grid_idx[ i ][ j ] ] = j - SubPicLeft[ subpic_grid_idx[ i ][ j - 1 ] ] + 1
        if( subpic_grid_idx[ i ][ j ] > NumSubPics)
            NumSubPics = subpic_grid_idx[ i ][ j ]
    }
}
```

FIG. 7

| seq_parameter_set_rbsp( ) { | Descriptor |
|---|---|
| ... | |
| log2_ctu_size_minus5 | u(2) |
| ... | |
| subpics_present_flag | u(1) |
| if( subpics_present_flag ) { | |
|   max_subpics_minus1 | u(8) |
| ~~  subpic_grid_col_width_minus1~~ | ~~u(v)~~ |
| ~~  subpic_grid_row_height_minus1~~ | ~~u(v)~~ |
|   for( i = 0; i < NumCtuRows; i++ ) | |
|     for( j = 0; j < NumCtuCols; j++ ) | |
|       subpic_id[ i ][ j ] | u(v) |
|   for( i = 0; i <= NumSubPics; i++ ) { | |
|     subpic_treated_as_pic_flag[ i ] | u(1) |
|     loop_filter_across_subpic_enabled_flag[ i ] | u(1) |
|   } | |
| } | |
| ... | |
| } | |

FIG. 8

| seq_parameter_set_rbsp( ) { | Descriptor |
|---|---|
| ... | |
| log2_ctu_size_minus5 | u(2) |
| ... | |
| subpics_present_flag | u(1) |
| if( subpics_present_flag ) { | |
|   max_subpics_minus1 | u(8) |
|   subpic_ctu_group_row_minus1 | u(v) |
|   subpic_ctu_group_col_minus1 | u(v) |
|   for( i = 0; i < NumCtuGroupRows; i++ ) | |
|     for( j = 0; j < NumCtuGroupCols; j++ ) | |
|       subpic_id[ i ][ j ] | u(v) |
|   for( i = 0; i <= NumSubPics; i++ ) { | |
|     subpic_treated_as_pic_flag[ i ] | u(1) |
|     loop_filter_across_subpic_enabled_flag[ i ] | u(1) |
|     subpic_ref_wraparound_enabled_flag[i] | |
|     if( subpic_ref_wraparound_enabled_flag[i] ) | ue(v) |
|       subpic_ref_wraparound_offset_minus1[i] | u(1) |
|   } | |
| } | |
| ... | |
| } | |

FIG. 9

| seq_parameter_set_rbsp( ) { | Descriptor |
|---|---|
| ... | |
|   log2_ctu_size_minus5 | u(2) |
| ... | |
|   subpics_present_flag | u(1) |
|   if( subpics_present_flag ) { | |
|     max_subpics_minus1 | u(8) |
|     uniform_subpic_spacing_flag | u(1) |
|     if( uniform_subpic_spacing_flag ) { | |
|       subpic_cols_width_minus1 | ue(v) |
|       subpic_rows_height_minus1 | ue(v) |
|     } else { | |
|       num_subpic_columns_minus1 | ue(v) |
|       num_subpic_rows_minus1 | ue(v) |
|       for( i = 0; i < num_subpic_columns_minus1; i++ ) | |
|         subpic_column_width_minus1[ i ] | ue(v) |
|       for( i = 0; i < num_tile_rows_minus1; i++ ) | |
|         subpic_row_height_minus1[ i ] | ue(v) |
|     } | |
|     explicit_subpic_id_flag | u(1) |
|     if( explicit_subpic_id_flag ) { | |
|       for( i = 0; i < NumSubpicsInPic; i++ ) { | |
|         subpic_id[ i ] | u(v) |
|       } | |
|     } | |
|   ... | |
| } | |

FIG.10

| seq_parameter_set_rbsp( ) { | Descriptor |
|---|---|
| ... | |
|   sps_log2_ctu_size_minus5 | u(2) |
| ... | |
|   sps_subpic_info_present_flag | u(1) |
|   if( sps_subpic_info_present_flag ) { | |
|     sps_num_subpics_minus1 | ue(v) |
|     if( sps_num_subpics_minus1 > 0 ) { | |
|       sps_independent_subpics_flag | u(1) |
|       sps_subpic_same_size_flag | u(1) |
|     } | |
|     for( i = 0; sps_num_subpics_minus1 > 0 && i <= sps_num_subpics_minus1; i++ ) { | |
|       if( !sps_subpic_same_size_flag \|\| i == 0 ) { | |
|         if( i > 0 && sps_pic_width_max_in_luma_samples > CtbSizeY ) | |
|           sps_subpic_ctu_top_left_x[ i ] | u(v) |
|         if( i > 0 && sps_pic_height_max_in_luma_samples > CtbSizeY ) | |
|           sps_subpic_ctu_top_left_y[ i ] | u(v) |
|         if( i < sps_num_subpics_minus1 && | |
|           sps_pic_width_max_in_luma_samples > CtbSizeY ) | |
|           sps_subpic_width_minus1[ i ] | u(v) |
|         if( i < sps_num_subpics_minus1 && | |
|           sps_pic_height_max_in_luma_samples > CtbSizeY ) | |
|           sps_subpic_height_minus1[ i ] | u(v) |
|       } | |
|       if( !sps_independent_subpics_flag) { | |
|         sps_subpic_treated_as_pic_flag[ i ] | u(1) |
|         sps_loop_filter_across_subpic_enabled_flag[ i ] | u(1) |
|       } | |
|     } | |
|     sps_subpic_id_len_minus1 | ue(v) |
|     sps_subpic_id_mapping_explicitly_signalled_flag | u(1) |
|     if( sps_subpic_id_mapping_explicitly_signalled_flag ) { | |
|       sps_subpic_id_mapping_present_flag | u(1) |
|       if( sps_subpic_id_mapping_present_flag ) | |
|         for( i = 0; i <= sps_num_subpics_minus1; i++ ) | |
|           sps_subpic_id[ i ] | u(v) |
|     } | |
|   ... | |
| } | |

FIG.11

| pic_parameter_set_rbsp( ) { | Descriptor |
|---|---|
| ... | |
|   single_tile_in_pic_flag | u(1) |
|   if( !single_tile_in_pic_flag ) { | |
|     uniform_tile_spacing_flag | u(1) |
|     if( uniform_tile_spacing_flag ) { | |
|       tile_cols_width_minus1 | ue(v) |
|       tile_rows_height_minus1 | ue(v) |
|     } else { | |
|       num_tile_columns_minus1 | ue(v) |
|       num_tile_rows_minus1 | ue(v) |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     brick_splitting_present_flag | u(1) |
|     if( uniform_tile_spacing_flag && brick_splitting_present_flag ) | |
|       num_tiles_in_pic_minus1 | ue(v) |
|   ... | |
|   for( i = 0; i <= num_tiles_in_pic_minus1 + 1; i++ ) | |
|     corresponding_subpic_id[i] | u(v) |
| ... | |
| } | |

FIG.12

| pic_parameter_set_rbsp( ) { | Descriptor |
|---|---|
|   if( uniform_tile_spacing_flag && brick_splitting_present_flag ) | |
|     num_tiles_in_pic_minus1 | ue(v) |
|   for( i = 0; brick_splitting_present_flag && i <= num_tiles_in_pic_minus1 + 1; i++ ) { | |
|     if( RowHeight[ i ] > 1 ) | |
|       brick_split_flag[ i ] | u(1) |
|     if( brick_split_flag[ i ] ) { | |
|       if( RowHeight[ i ] > 2 ) | |
|         uniform_brick_spacing_flag[ i ] | u(1) |
|       if( uniform_brick_spacing_flag[ i ] ) | |
|         brick_height_minus1[ i ] | ue(v) |
|       else { | |
|         num_brick_rows_minus2[ i ] | ue(v) |
|         for( j = 0; j <= num_brick_rows_minus2[ i ]; j++ ) | |
|           brick_row_height_minus1[ i ][ j ] | ue(v) |
|       } | |
|     } | |
|     for( j = 0; j < NumBricksInTile; j++ ) | |
|       corresponding_subpic_id[j] | u(v) |
|   } | |
|   ... | |
| } | |

FIG.13

| slice_header( ) { | Descriptor |
|---|---|
| ... | |
| corresponding_subpic_id[i] | u(v) |
| ... | |
| } | |

IMAGE ENCODING/DECODING METHOD AND DEVICE, AND RECORDING MEDIUM STORING BITSTREAM

TECHNICAL FIELD

The present invention relates to a method and apparatus for encoding/decoding an image and apparatus, and a recording medium for storing a bitstream.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

DISCLOSURE

Technical Problem

An object of the present invention is to provide an image encoding/decoding method and apparatus with improved compression efficiency.

Another object of the present invention is to provide an image encoding/decoding method and apparatus by sub-picture information.

Another object of the present invention is to provide a recording medium for storing a bitstream generated by an image encoding/decoding method or apparatus according to the present invention.

Technical Solution

An image decoding method according to an embodiment of the present disclosure comprises, obtaining sub-picture information of a current sub-picture through at least one signaling level and decoding the current sub-picture using the sub-picture information, wherein the sub-picture information is obtained for each decoded sub-picture.

The at least one signaling level is determined as at least one of a sequence parameter set (SPS), a picture parameter set (PPS) or a slice header.

The sub-picture information includes a sub-picture ID of the sub-picture.

The sub-picture information includes information indicating whether sub-pictures included in the current picture have the same size.

When the sub-pictures included in the current picture do not have the same size, the sub-picture information includes location information of the current sub-picture, and A location indicated by the location information of the current sub-picture is a location of a top left coding tree unit (CTU) included in the current sub-picture.

When the sub-pictures included in the current picture do not have the same size, the sub-picture information includes size information of the current sub-picture, and the size information of the current sub-picture includes width and height information of the current sub-picture.

When all the sub-pictures included in the current picture have the same size, the same size is preset.

The sub-picture ID is individually obtained at different signaling levels.

When the at least one signaling level is an SPS, the sub-picture information includes information indicating whether the sub-picture ID of the current sub-picture is explicitly signaled.

When information indicating whether the sub-picture ID of the current sub-picture is explicitly signaled indicates that the sub-picture ID is explicitly signaled, the sub-picture information includes information indicating at which signaling level the sub-picture ID is signaled.

The sub-picture information includes information indicating whether decoding is performed by determining the current sub-picture as a picture.

The sub-picture information includes sub-picture filtering information indicating whether to apply filtering to a boundary of the current sub-picture.

An image encoding method according to an embodiment of the present disclosure comprises, determining sub-picture information of a current sub-picture and encoding the sub-picture information through at least one signaling level, wherein the sub-picture information is obtained for each encoded sub-picture.

The at least one signaling level is determined as at least one of a sequence parameter set (SPS), a picture parameter set (PPS) or a slice header.

The sub-picture information includes a sub-picture ID of the sub-picture.

A computer-readable recording medium for storing a bitstream received by an image decoding apparatus and used to reconstruct a current block included in a current picture, the bitstream being generated by an image encoding method according to the present disclosure, the image encoding method comprises, determining sub-picture information of a current sub-picture; and encoding the sub-picture information through at least one signaling level, wherein the sub-picture information is obtained for each encoded sub-picture.

The at least one signaling level is determined as at least one of a sequence parameter set (SPS), a picture parameter set (PPS) or a slice header.

The sub-picture information includes a sub-picture ID of the sub-picture.

Advantageous Effects

According to the present invention, it is possible to provide an image encoding/decoding method and apparatus, a recording medium storing a bitstream generated by the image encoding method/apparatus, with improved compression efficiency.

In addition, according to the present invention, it is possible to provide an image encoding/decoding method and apparatus, a recording medium storing a bitstream generated by the image encoding method/apparatus by signaling subpicture information.

DESCRIPTION OF DRAWINGS

FIG. 5 is a view illustrating a bitstream structure of a sequence parameter set (SPS) according to an embodiment of the present invention.

FIG. 6 is a view illustrating a method of deriving subpicture information based on a specific grid index.

FIG. 7 is a view illustrating a bitstream structure of an SPS according to another embodiment of the present invention.

FIG. 8 is a view illustrating a bitstream structure of an SPS according to another embodiment of the present invention.

FIG. 9 is a view illustrating a bitstream structure of an SPS according to another embodiment of the present invention.

FIG. 10 is a view illustrating a bitstream structure of an SPS according to another embodiment of the present invention.

FIG. 11 is a view illustrating a bitstream structure of a picture parameter set (PPS) according to another embodiment of the present invention.

FIG. 12 is a view illustrating a bitstream structure of a PPS according to another embodiment of the present invention.

FIG. 13 is a view illustrating a bitstream structure of a slice header according to another embodiment of the present invention.

MODE FOR INVENTION

Figure 1:
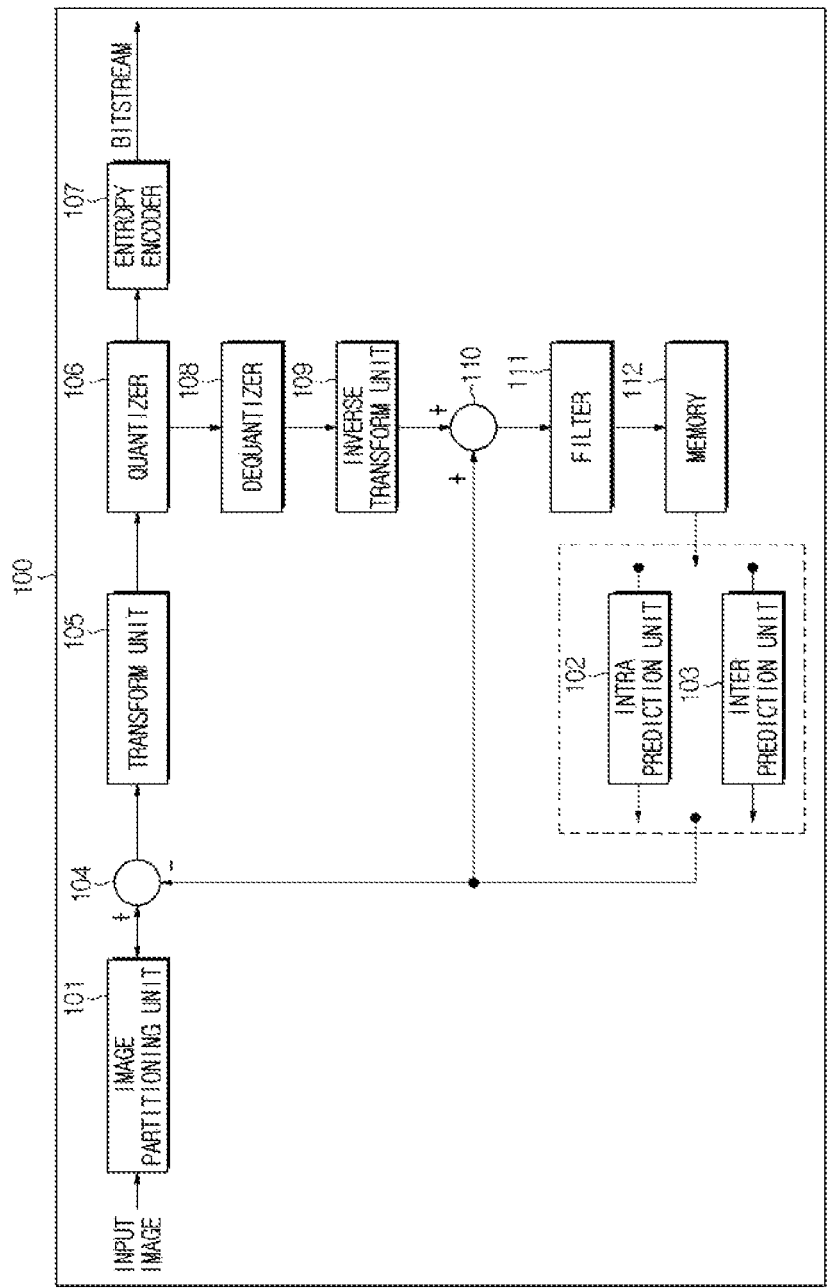
FIG. 1 is a block diagram showing an image encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, embodiments of the present invention will be described in detail with reference to the accompanying drawings. The same constituent elements in the drawings are denoted by the same reference numerals, and a repeated description of the same elements will be omitted.

FIG. 1 is a block diagram showing an image encoding apparatus according to an embodiment of the present invention.

Referring to FIG. 1, the image encoding apparatus 100 may include an image partitioning unit 101, an intra prediction unit 102, an inter prediction unit 103, a subtractor 104, a transform unit 105, a quantizer 106, an entropy encoder 107, a dequantizer 108, an inverse transform unit 109, an adder 110, a filter 111 and a memory 112.

The components shown in FIG. 1 are independently shown to represent different characteristic functions in the image encoding apparatus, which does not mean that the components are configured in separate hardware or a single software component. That is, each component is listed and included as each component for convenience of description and at least two of the components are combined as one component or one component is divided into a plurality of components to perform functions. Embodiments in which the components are combined and embodiments in which the components are divided are included in the scope of the present invention without departing from the essence of the present invention.

In addition, some of the components are not essential components for performing essential functions in the present invention and may be optional components for improving performance. The present invention may be implemented to include only components essential to implement the essence of the present invention excluding the components used to improve performance, and a structure including only essential components excluding optional components used for improving performance is also included in the scope of the present invention.

The image partitioning unit 101 may partition an input image into at least one block. At this time, the input image may have various shapes or sizes such as pictures, slices, tiles, segments, etc. The block may mean a coding unit (CU), a prediction unit (PU) or a transform unit (TU). Partitioning may be performed based on at least one of a quadtree, a binary tree or a ternary tree. The quadtree is a method of quartering an upper block into lower blocks, the width and height of which are half those of the upper block. The binary tree is a method of halving an upper block into lower blocks, the width or height of which is half that of the upper block. The ternary tree is a method of partitioning an upper block into three lower blocks. For example, the three lower blocks may be obtained by partitioning the width or height of the upper block in a ratio of 1:2:1. Through the above-described binary tree based partitioning, the block may have a square shape or a non-square shape.

The prediction units 102 and 103 may include the inter prediction unit 103 for performing inter prediction and the intra prediction unit 102 for performing intra prediction. It is possible to determine whether inter prediction or intra prediction is performed with respect to a prediction unit and to determine detailed information (e.g., an intra prediction mode, a motion vector, a reference picture, etc.) according to each prediction method. At this time, a processing unit in which prediction is performed and a processing unit in which a prediction method and details are determined may be different. For example, a prediction method and a prediction mode are determined in prediction units and prediction may be performed in transform units.

A residual value (residual block) between a generated prediction block and an original block may be input to the transform unit 105. In addition, prediction mode information, motion vector information, etc. used for prediction may be encoded in the entropy encoder 107 together with the residual value and transmitted to a decoder. When a specific encoding mode is used, the original block may be encoded and transmitted to the decoder, without generating a prediction block through the prediction units 102 and 103.

The intra prediction unit 102 may generate a prediction block based on reference pixel information around a current block which is pixel information of a current picture. When the prediction mode of a neighboring block of the current block which will be subjected to intra prediction is inter prediction, a reference pixel included in the neighboring block, to which inter prediction has been applied, may be replaced with a reference pixel in another neighboring block, to which intra prediction has been applied. That is, when a reference pixel is not available, the unavailable reference pixel information may be replaced with at least one of available reference pixels.

In intra prediction, a prediction mode may have a directional prediction mode in which reference pixel information is used according to a prediction direction and a non-directional mode in which directional information is not used when prediction is performed. A mode for predicting luma information and a mode for predicting chroma information may be different, and predicted luma signal information or intra prediction mode information used to predict luma information may be used to predict chroma information.

The intra prediction unit 102 may include an adaptive intra smoothing (AIS) filter, a reference pixel interpolation unit and a DC filter. The AIS filter performs filtering with respect to the reference pixel of a current block and may adaptively determine whether to apply the filter according to the prediction mode of a current prediction unit. When the prediction mode of the current block is a mode in which AIS filtering is not performed, the AIS filter may not be applied.

When the intra prediction mode of the prediction unit is a prediction unit for performing intra prediction based on a pixel value obtained by interpolating a reference pixel, the reference pixel interpolation unit of the intra prediction unit 102 may interpolate the reference pixel to generate the reference pixel at a fractional unit location. When the prediction mode of the current prediction unit is a prediction mode in which a prediction block is generated without interpolating a reference pixel, the reference pixel may not be interpolated. The DC filter may generate a prediction block through filtering when the prediction mode of the current block is a DC mode.

The inter prediction unit 103 generates a prediction block using motion information and a previously reconstructed reference image stored in the memory 112. The motion information may include, for example, a motion vector, a reference picture index, a list 1 prediction flag, a list 0 prediction flag, etc.

A residual block including residual information which is a difference value between the prediction block generated in the prediction units 102 and 103 and the original block of the prediction unit may be generated. The generated residual block may be input to the transform unit 105, thereby being transformed.

The inter prediction unit 103 may derive a prediction block based on information on at least one of a previous picture or a subsequent picture of a current picture. In addition, the prediction block of the current block may be derived based on information of a partial region, in which encoding is completed, of the current picture. The inter prediction unit 103 according to the embodiment of the present invention may include a reference picture interpolation unit, a motion prediction unit and a motion compensator.

The reference picture interpolation unit may receive the reference picture information from the memory 112 and generate pixel information of an integer pixel or less from the reference picture. In the case of a luma pixel, a DCT-based 8-tap interpolation filter for changing a filter coefficient may be used to generate pixel information of an integer pixel or less in units of ¼ pixels. In the case of a chroma signal, a DCT-based 4-tap interpolation filter for changing a filter coefficient may be used to generate pixel information of an integer pixel or less in units of ⅛ pixels.

The motion prediction unit may perform motion prediction based on the reference picture interpolated by the reference picture interpolation unit. As a method of calculating a motion vector, various methods such as a FBMA (Full search-based Block Matching Algorithm), a TSS (Three Step Search), a NTS (New Three-Step Search Algorithm), etc. may be used. A motion vector may have a motion vector value in units of ½ or ¼ pixels based on the interpolated pixel. The motion prediction unit may predict the prediction block of the current block by changing the motion prediction method. As a motion prediction method, a skip method, a merge method, an AMVP (Advanced Motion Vector Prediction) method, etc. may be used.

The subtractor 104 generates a residual block of the current block by subtracting the prediction block generated by the intra prediction unit 102 or the inter prediction unit 103 from a block which is currently encoded.

The transform unit 105 may transform the residual block including the residual data using a transform method such as DCT, DST, KLT (Karhunen Loeve Transform), etc. At this time, the transform method may be determined based on the intra prediction mode of the prediction unit used to generate the residual block. For example, according to the intra prediction mode, DCT may be used in a horizontal direction and DST may be used in a vertical direction.

The quantizer 106 may quantize values transformed into the frequency region by the transform unit 105. Quantization coefficients may be changed according to the block or the degree of importance of the image. The value calculated by the quantizer 106 may be supplied to the dequantizer 108 and the entropy encoder 107.

The transform unit 105 and/or the quantizer 106 may be selectively included in the image encoding apparatus 100. That is, the image encoding apparatus 100 may perform at least one of transform or quantization with respect to the residual data of the residual block or skip both transform and quantization to encode the residual block. Even if any one or both of transform or quantization is not performed in the image encoding apparatus 100, a block input to the entropy encoder 107 is commonly referred to as a transform block. The entropy encoder 107 entropy-encodes input data. As entropy encoding, various encoding methods such as Exponential Golomb, CAVLC (Context-Adaptive Variable Length Coding), CABAC (Context-Adaptive Binary Arithmetic Coding), etc. may be used.

The entropy encoder 107 may encode a variety of information such as coefficient information of a transform block, block type information, prediction mode information, partitioning unit information, prediction unit information, transform unit information, motion vector information, reference frame information, interpolation information of a block, filtering information, etc. Coefficients of the transform block may be encoded in units of sub-blocks in the transform block.

For encoding of the coefficient of the transform block, various syntax elements such as Last_sig which is a syntax element indicating the location of a first non-zero coefficient, Coded_sub_blk_flag which is a flag indicating whether there is at least one non-zero coefficient in a sub-block, Sig_coeff_flag which is a flag indicating a non-zero coefficient, Abs_greater1_flag which is a flag indicating whether the absolute value of a coefficient is greater than 1, Abs_greater2_flag which is a flag indicating whether the absolute value of a coefficient is greater than 2, Sign_flag which is a flag indicating the sign of a coefficient may be encoded in inverse scan order. The residual value of the coefficient which is not encoded with the syntax elements may be encoded through a syntax element remaining_coeff.

The dequantizer 108 and the inverse transform unit 109 may dequantize the values quantized by the quantizer 106 and inversely transform the values transformed by the transform unit 105, respectively. The residual values generated by the dequantizer 108 and the inverse transform unit 109 are combined with the prediction unit predicted through a motion estimator and a motion compensator included in the inter prediction unit 103 and the intra prediction unit 102, thereby generating a reconstructed block. The adder 110 may generate the reconstructed block by adding the prediction block generated by the prediction units 102 and 103 and the residual block generated through the inverse transform unit 109.

The filter 111 may include at least one of a deblocking filter, an offset correction unit or an adaptive loop filter (ALF).

The deblocking filter may remove block distortion caused by a boundary between blocks in the reconstructed picture. In order to determine whether deblocking is performed, it may be determined whether to apply the deblocking filter to a current block based on pixels included in several columns or rows included in the block. When the deblocking is applied to the block, a strong filter or a weak filter may be applied according to required deblocking filtering strength. In addition, in applying the deblocking filter, horizontal filtering and vertical filtering may be performed in parallel when vertical filtering and horizontal filtering are performed.

The offset correction unit may correct an offset from the original image in pixel units with respect to the deblocked image. In order to perform offset correction with respect to a specific picture, a method of determining a region in which an offset will be performed after a pixel included in an image is divided into a certain number of regions and applying an offset to the corresponding regions or a method of applying an offset in consideration of edge information of each pixel may be used.

The ALF may be performed based on a value obtained by comparing the filtered reconstruction image and the original image. After pixels included in the image are divided into a predetermined groups, one filter to be applied to a corresponding group may be determined, thereby differentially performing filtering for each group. Information related to whether to apply the ALF may be transmitted for each coding unit (CU) and the filter coefficient and shape of the ALF to be applied may vary according to each block. In addition, the ALF having the same shape (the fixed shape) may be applied regardless of the characteristics of the block to be applied.

The memory 112 may store the reconstructed block or picture calculated through the filter 111, and the stored reconstructed block or picture may be supplied to the inter prediction unit 103 when inter prediction is performed.

Figure 2:
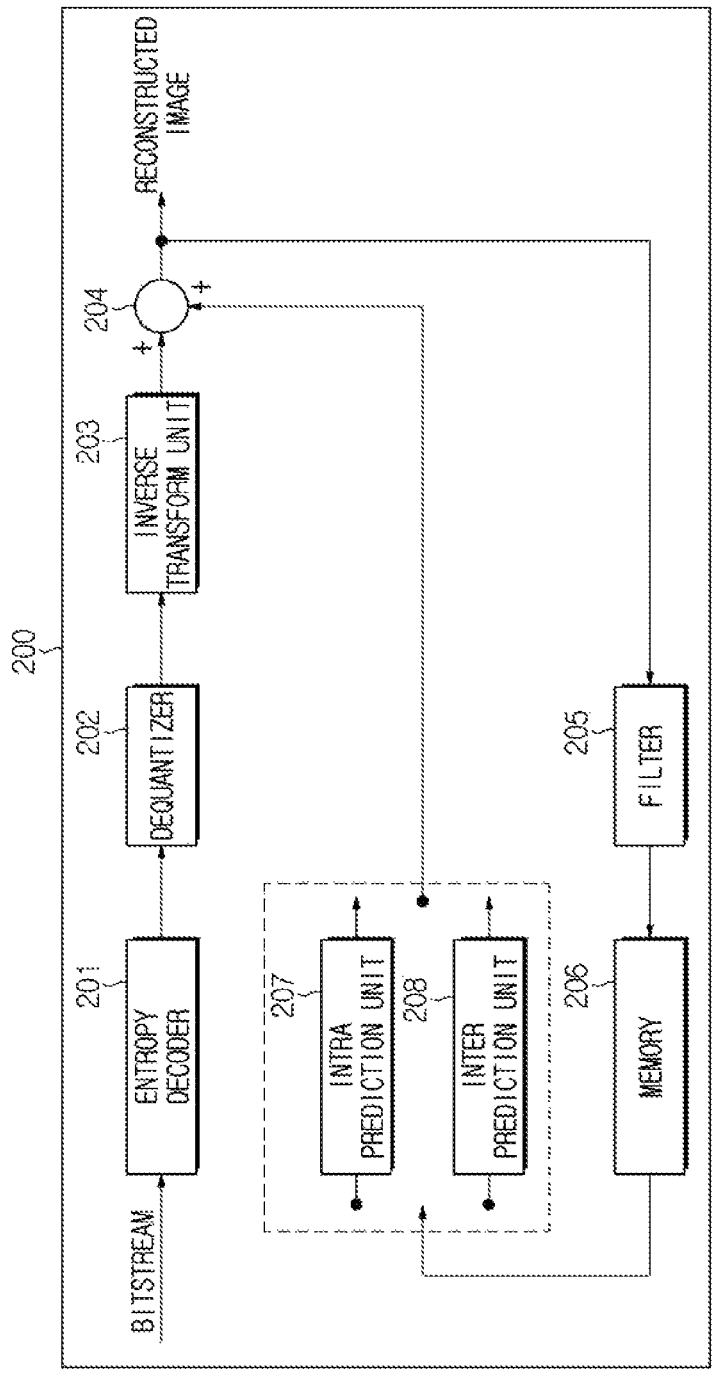
FIG. 2 is a block diagram showing an image decoding apparatus according to an embodiment of the present invention.

Next, an image decoding apparatus according to an embodiment of the present invention will be described with reference to the drawing. FIG. 2 is a block diagram showing an image decoding apparatus 200 according to an embodiment of the present invention.

Referring to FIG. 2, the image decoding apparatus 200 may include an entropy decoder 201, a dequantizer 202, an inverse transform unit 203, an adder 204, a filter 205, a memory 206 and prediction units 207 and 208.

When an image bitstream generated by the image encoding apparatus 100 is input to the image decoding apparatus 200, the input bitstream may be decoded according to a process opposite to a process performed by the image encoding apparatus 100.

The entropy decoder 201 may perform entropy decoding as a procedure opposite to entropy encoding performed by the entropy encoder 107 of the image encoding apparatus 100. For example, various methods such as Exponential Golomb, CAVLC (Context-Adaptive Variable Length Coding), CABAC (Context-Adaptive Binary Arithmetic Coding), etc. may be applied in response to the method performed by the image encoder. The entropy decoder 201 may decode the above-described syntax elements, that is, Last_sig, Coded_sub_blk_flag, Sig_coeff_flag, Abs_greater1_flag, Abs_greater2_flag, Sign_flag and remaining_coeff. In addition, the entropy decoder 201 may decode information related to intra prediction and inter prediction performed by the image encoding apparatus 100.

The dequantizer 202 generates a transform block by dequantizing the quantized transform block. The substantially same operation as the dequantizer 108 of FIG. 1 is performed.

The inverse transform unit 203 generates a residual block by inversely transforming the transform block. At this time, the transform method may be determined based on a prediction method (inter or intra prediction), a block size and/or shape, an intra prediction mode, etc. The substantially same operation as the inverse transform unit 109 of FIG. 1 is performed.

The adder 204 generates a reconstructed block by adding the prediction block generated by the intra prediction unit 207 or the inter prediction unit 208 and the residual block generated through the inverse transform unit 203. The substantially same operation as the adder 110 of FIG. 1 is performed.

The filter 205 reduces various types of noise occurring in the reconstructed blocks.

The filter 205 may include a deblocking filter, an offset correction unit or an adaptive loop filter (ALF).

Information on whether the deblocking filter has been applied to a corresponding block or picture and information on whether a strong filter or a weak filter has been applied when the deblocking filter has been applied may be received from the image encoding apparatus 100. The deblocking filter of the image decoding apparatus 200 may receive information related to the deblocking filter provided by the image encoding apparatus 100 and perform deblocking filtering with respect to the corresponding block in the image decoding apparatus 200.

The offset correction unit may perform offset correction with respect to the reconstructed image based on the type of offset correction applied to the image during encoding and offset value information.

The ALF may be applied to a coding unit based on information on whether to apply the ALF, ALF coefficient information received from the image encoding apparatus 100. Such ALF information may be included in a specific parameter set and provided. The filter 205 performs the substantially same operation as the filter 111 of FIG. 1.

The memory 206 stores the reconstructed block generated by the adder 204. The substantially same operation as the memory 112 of FIG. 1 is performed.

The prediction units 207 and 208 may generate a prediction block based on prediction block generation related information provided by the entropy decoder 201 and previously decoded block or picture information provided by the memory 206.

The prediction units 207 and 208 may include the intra prediction unit 207 and the inter prediction unit 208. Although not shown separately, the prediction units 207 and 208 may further include a prediction unit determination unit. The prediction unit determination unit may receive a variety of information such as prediction unit information received from the entropy decoder 201, prediction mode information of an intra prediction method, motion prediction related information of an inter prediction method, etc., identify a prediction unit in a current coding unit, and determine whether inter prediction or intra prediction is performed with respect to the prediction unit. The inter prediction unit 208 may perform inter prediction with respect to the current prediction unit based on information included in at least one of a previous picture or a subsequent picture of the current picture including the current prediction unit using information necessary for inter prediction of the current prediction unit provided by the image encoding apparatus 100. Alternatively, inter prediction may be performed based on information on a previously reconstructed partial region in the current picture including the current prediction unit.

To perform inter prediction, it may be determined whether the motion prediction method of the prediction unit included in the corresponding coding unit based on the coding unit is a skip mode, a merge mode or an AMVP mode.

The intra prediction unit 207 generates a prediction block using previously reconstructed pixels located around a block which is currently encoded.

The intra prediction unit 207 may include an AIS (Adaptive Intra Smoothing) filter, a reference pixel interpolation unit and a DC filter. The AIS filter performs filtering with respect to the reference pixel of the current block and may adaptively determine whether to apply the filter according to the prediction mode of the current prediction unit. AIS filtering may be performed with respect to the reference pixel of the current block using the AIS filter information and the prediction mode of the prediction unit provided by the image encoding apparatus 100. When the prediction mode of the current block is a mode in which AIS filtering is not performed, the AIS filter may not be applied.

The reference pixel interpolation unit of the intra prediction unit 207 may generate the reference pixel at a fractional unit location by interpolating the reference pixel, when the prediction mode of the prediction unit is a prediction unit for performing intra prediction based on a pixel value obtained by interpolating the reference pixel. The generated reference pixel at the fractional unit location may be used as the prediction pixel of the pixel in the current block. When the prediction mode of the current prediction unit is a prediction in which the prediction block is generated without interpolating the reference pixel, the reference pixel may not be interpolated. The DC filter may generate the prediction block through filtering when the prediction mode of the current block is a DC mode.

The intra prediction unit 207 performs the substantially same operation as the intra prediction unit 102 of FIG. 1.

The inter prediction unit 208 generates an inter prediction block using the reference picture and motion information stored in the memory 206. The inter prediction unit 208 performs the substantially same operation as the inter prediction unit 103 of FIG. 1.

Meanwhile, the following terms may be defined in the following description.

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{B_d}-1$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Hereinafter, a method of transmitting sub-picture information according to some embodiments of the present invention will be described in detail.

Figure 3:
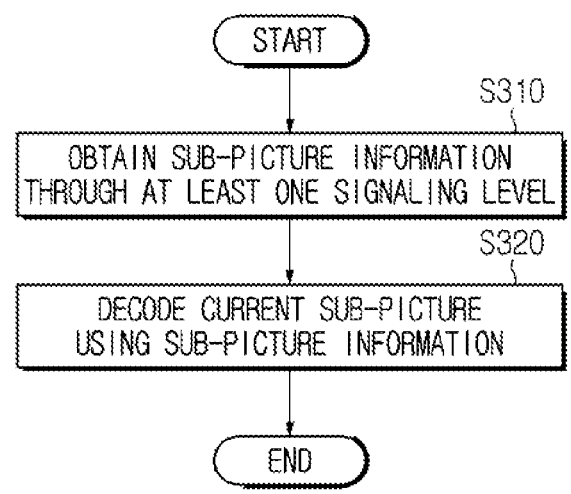
FIG. 3 is a view illustrating an image decoding method according to an embodiment of the present invention.

FIG. 3 is a view illustrating an image decoding method according to an embodiment of the present invention.

Referring to FIG. 3, the image decoding method according to the embodiment of the present invention may include obtaining sub-picture information of a current sub-picture through at least one signaling level (S310) and decoding the current sub-picture using the sub-picture information (S320).

At this time, the sub-picture information may be obtained for each decoded sub-picture, and at least one signaling level may be determined as at least one of a sequence parameter set (SPS), a picture parameter set (PPS) or a slice header.

Figure 4:
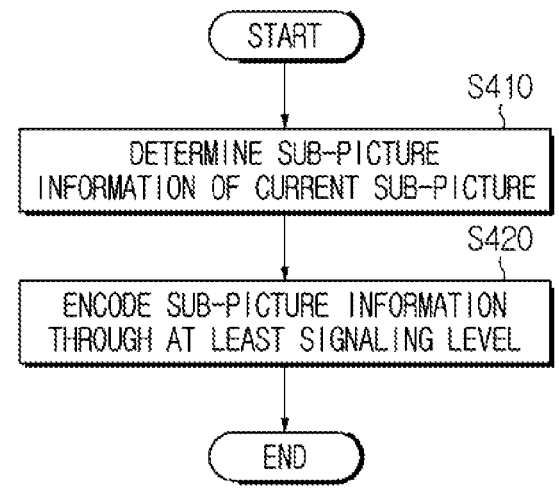
FIG. 4 is a view illustrating an image encoding method according to an embodiment of the present invention.

FIG. 4 is a view illustrating an image encoding method according to an embodiment of the present invention.

Referring to FIG. 4, the image encoding method according to the embodiment of the present invention may include determining sub-picture information of a current sub-picture (S410) and encoding the sub-picture information through at least one signaling level (S420).

At this time, the sub-picture information may be determined for each encoded sub-picture, and at least one signaling level may be determined as at least one of a sequence parameter set (SPS), a picture parameter set (PPS) or a slice header.

Hereinafter, a detailed embodiment applicable to each component of FIGS. 3 and 4 will be described in detail.

According to an embodiment of the present invention, the sub-picture information may be transmitted through a sequence parameter set (SPS).

In the following description, the sub-picture is a unit configuring a picture and may mean a rectangular region consisting of one or more slices.

According to an embodiment of the present invention, a grid defined in units of 4×N pixel samples may be defined. Each grid may include grid index information, and one sub-picture may be defined as a set of grids having the same grid index.

For example, sub-picture information may include information indicating whether to perform encoding/decoding by determining each sub-picture as one picture. For example, the information indicating whether to perform encoding/decoding by determining each sub-picture as one picture may be defined as a syntax element subpic_treated_as_pic_flag or sps_subpic_treated_as_pic_flag. For example, sps_subpic_treated_as_pic_flag[i] may be a syntax element indicating whether to perform encoding/decoding by determining an i-th sub-picture as a picture, when the i-th sub-picture is encoded/decoded.

As another example, the sub-picture information may include sub-picture filtering information indicating whether to apply filtering to the boundary of each sub-picture. For example, the sub-picture filtering information may be defined as a syntax element loop_filter_across_subpic_enabled_flag or sps_loop_filter_across_subpic_enabled_flag. For example, sps_loop_filter_across_subpic_enabled_flag[i] may be a syntax element indicating whether filtering is performed with respect to the boundary of the i-th sub-picture.

Meanwhile, when there are a first sub-picture and a second sub-picture and the index of the first sub-picture is less than that of the second sub-picture, encoding/decoding of the first sub-picture may be performed before encoding/decoding of the second sub-picture.

FIG. 5 is a view illustrating a bitstream structure of a sequence parameter set (SPS) according to an embodiment of the present invention.

Syntax elements pic_width_max_in_luma_samples or sps_pic_width_max_in_luma_samples and pic_height_max_in_luma_samples or sps_pic_height_max_in_luma_samples may indicate the maximum width and height of an encoded/decoded current picture.

A syntax element subpics_present_flag or sps_subpic_info_present_flag may indicate whether sub-picture information is encoded/decoded in SPS units.

Meanwhile, when an input bitstream is a bitstream generated by a sub-bitstream and a sub-bitstream is for a sub-picture, subpics_present_flag or sps_subpic_info_present_flag may indicate that sub-picture information is always encoded/decoded.

A syntax element max_subpic_minus1 may indicate a value obtained by subtracting 1 from the maximum number of sub-pictures which may be included in the current picture. For example, max_subpic_minus1 may have a value from 0 to 254.

A syntax element sps_num_subpics_minus1 may indicate the number of sub-pictures included in the current picture. In the following description, signaling of max_subpic_minus1 may be replaced with signaling of sps_num_subpics_minus1.

Syntax elements subpic_grid_col_width_minus1 and subpic_grid_row_height_minus1 may indicate the sizes of a grid configuring the column and row of the sub-picture. The number of samples included in the width and height of the grid may be a value obtained by respectively multiplying subpic_grid_col_width_minus1+1 and subpic_grid_row_height_minus1+1 by 4.

For example, the number of grids included in the column of the sub-picture may be derived according to Equation 1 below.

$$NumSubPicGridCols = (\text{pic\_width\_max\_in\_luma\_samples} + \text{subpic\_grid\_col\_width\_minus1} * 4 + 3) / (\text{subpic\_grid\_col\_width\_minus1} * 4 + 4)$$ [Equation 1]

In addition, for example, the number of girds included in the row of the sub-picture may be derived according to Equation 2 below.

$$NumSubPicGridRows = (\text{pic\_height\_max\_in\_luma\_samples} + \text{subpic\_grid\_row\_height\_minus1} * 4 + 3) / (\text{subpic\_grid\_row\_height\_minus1} * 4 + 4)$$ [Equation 2]

A syntax element subpic_grid_idx may indicate a grid index. As described above, grids having the same grid index may configure one sub-picture.

A syntax element NumSubPics may mean the total number of sub-pictures included in the current picture.

FIG. 6 is a view illustrating a method of deriving sub-picture information based on a specific grid index.

Sub-picture information of a sub-picture having the grid index of subpic_grid_idx[i][j] may be derived according to FIG. 6. For example, according to FIG. 6, a top grid row (SubPicTop) of a current sub-picture, a left grid column (SubPicLeft) of a sub-picture, the number (SubPicWidth) of grids included in the row of the sub-picture, the number (SubPicHeight) of grids included in the column of the sub-picture, and the total number (NumSubPics) of sub-pictures may be determined.

A syntax element log 2_ctu_size_minus5 or sps_log 2_ctu_size_minus5 may be coding tree unit (CTU) size information meaning a value obtained by subtracting 5 from a value obtained by calculating logarithm of a CTU size.

Referring to FIG. 5, only when the value of subpics_present_flag signaled through the SPS is 1, at least one of max_subpics_minus1, subpic_grid_col_width_minus1, subpic_grid_row_height_minus1, subpic_grid_idx[i][j], subpic_treated_as_pic_flag[i] or loop_filter_across_subpic_enabled_flag[i], which is sub-picture information, may be encoded/decoded.

According to another embodiment of the present invention, a sub-picture may be signaled in CTU units.

In the embodiment of FIG. 5, the reason why sub-picture information is signaled in grid units is because sub-picture information is signaled before CTU size information. According to another embodiment of the present invention, CTU size information may be signaled before sub-picture information, and sub-picture information may be signaled based on a CTU unit.

According to another embodiment of the present invention, a sub-picture ID for identifying a sub-picture may be defined. In the following description, a sub-picture ID and a sub-picture index may have the same meaning. As shown in FIG. 5, when a sub-picture is signaled using a grid index, since regions divided into grids are combined to determine one sub-picture, a sub-picture ID indicating a sub-picture itself may not be defined. When sub-picture information is signaled using the sub-picture ID, since the partitioning information of the sub-picture and each sub-picture are unified at all levels referring to the SPS, image encoding/decoding efficiency may increase.

For example, a sub-picture ID equally applicable to variously divided regions such as a picture parameter set (PPS) or a slice header which is a lower signaling level than an SPS may be signaled for each signaling level.

FIG. 7 is a view illustrating a bitstream structure of an SPS according to another embodiment of the present invention.

According to another embodiment of the present invention, in transmitting sub-picture information, sub-picture information may be transmitted in CTU units. Alternatively, sub-picture information may be signaled based on a unit obtained by multiplying the width and/or height according to a CTU unit by 1/n or n. For example, n may be a positive integer such as 1, 2, 4, 8, 16, 32, 64 or more. For example, sub-picture information may include a sub-picture ID, and the sub-picture ID may be defined as a syntax element subpic_id or sps_subpic_id.

Referring to FIG. 7, the CTU size information may be signaled before sub-picture information.

Meanwhile, a syntax element log 2_ctu_size_minus5 may be explicitly signaled, and may be determined as a pre-set value in the image encoding/decoding apparatus. For example, the pre-set value may be one of a minimum value or a maximum value of a CTU size allowed in the image encoding/decoding apparatus.

NumCtuRows and NumCtuCols which are the numbers of CTUs present in a picture in the horizontal and vertical direction may be calculated using at least one of log 2_ctu_size_minus5, pic_width_max_in_luma_samples, or pic_height_max_in_luma_samples.

According to the present embodiment, CTUs having the same sub-picture ID may be included in the same sub-picture. Meanwhile, for some regions, the sub-picture ID may be derived by the image encoding/decoding apparatus without signaling. When subpic_id is signaled as the same value as max_subpics_minus1 or sps_num_subpics_minus1, subpic_id may not be signaled for at least one of CTUs encoded/decoded after a corresponding CTU unit. For example, subpic_id of a CTU encoded/decoded after the corresponding CTU unit may be derived to have the same value as max_subpics_minus1.

Meanwhile, the binary length of subpic_id may be determined as Ceil(Log 2(max_subpics_minus1+1)).

The SPS bitstream of FIG. 7 is different from FIG. 5 in that the signaling order of the CTU size information precedes that of sub-picture information, signaling of subpic_grid_col_width_minus1 and subpic_grid_row_height_minus1 is not performed, subpic_grid_idx is changed to subpic_id and/or subpic_id is signaled in CTU units. That is, according to another embodiment of the present invention, sub-picture information may be signaled by subpic_id determined in CTU units.

Among the syntax elements described in FIG. 7, the syntax elements also described in FIG. 5 have the same operations as FIG. 5 and thus a detailed description thereof will be omitted.

FIG. 8 is a view illustrating a bitstream structure of an SPS according to another embodiment of the present invention.

According to another embodiment of the present invention, in transmitting sub-picture information, sub-picture information may be transmitted in CTU group units. A CTU group may mean a set of one or more pre-set CTUs. For example, the sub-picture information may include a sub-picture ID.

Syntax elements subpic_ctu_group_col_minus1 and subpic_ctu_group_row_minus1 may indicate values obtained by subtracting 1 from the number of sub-picture groups included in the row and column of the sub-picture.

For example, only one of subpic_ctu_group_col_minus1 and subpic_ctu_group_row_minus1 may be signaled. As another example, at least one of subpic_ctu_group_col_minus1 or subpic_ctu_group_row_minus1 may be determined based on max_subpics_minus1, or signaling may be determined based on max_subpics_minus1. As another example, one of subpic_ctu_group_col_minus1 and subpic_ctu_group_row_minus1 may be determined based on the other or signaling may be determined by the other.

NumCtuRows and NumCtuCols which are the numbers of CTUs present in the picture in the horizontal and vertical direction may be calculated using at least one of log 2_ctu_size_minus5, pic_width_max_in_luma_samples, pic_height_max_in_luma_samples, subpic_ctu_group_col_minus1 and subpic_ctu_group_row_minus1.

According to the present embodiment, a CTU group having the same sub-picture ID may be included in the same sub-picture.

A reference wraparound offset may be specified for each sub-picture based on the transmitted subpic_id and motion correction may be separately performed. For example, a syntax element subpic_ref_wraparound_enabled_flag indicating whether sub-picture reference wraparound is capable of being performed and/or a syntax element subpic_ref_wraparound_offset_minus1 indicating a sub-picture reference wraparound offset may be defined. At least one of subpic_ref_wraparound_enabled_flag or subpic_ref_wraparound_offset_minus1 may be defined as reference wraparound information.

The SPS bitstream of FIG. 8 may be different from that of FIG. 7 in that subpic_id is transmitted in CTU group units, a syntax element defining a CTU group is signaled and/or reference wraparound information is transmitted.

Among the syntax elements described in FIG. 8, the syntax elements also described in FIG. 5 and/or FIG. 7 have the same operations as FIG. 5 and/or FIG. 7 and thus a detailed description thereof will be omitted.

FIG. 9 is a view illustrating a bitstream structure of an SPS according to another embodiment of the present invention.

According to another embodiment of the present invention, information indicating whether a sub-picture included in a picture is partitioned to have the same size may be defined.

Information indicating whether the sub-picture included in the picture is partitioned to have the same size may be defined as a syntax element uniform_subpic_spacing_flag, uniform_subpic_flag or sps_subpic_same_size_flag.

For example, when uniform_subpic_spacing_flag or sps_subpic_same_size_flag is 0, the numbers of sub-pictures included in the row and column of the picture may be respectively signaled through syntax elements num_subpic_rows_minus1 and num_subpic_columns_minus1, and the width and height of the sub-picture included in the row and column of the picture may be signaled through syntax elements subpic_column_width_minus1 or sps_subpic_width_minus1 and subpic_row_height_minus1 or sps_subpic_height_minus1. That is, the syntax element subpic_column_width_minus1 or sps_subpic_width_minus1 may indicate the width of the current sub-picture, and the syntax element subpic_row_height_minus1 or sps_subpic_height_minus1 may indicate the height of the current sub-picture.

In contrast, when uniform_subpic_spacing_flag or sps_subpic_same_size_flag is 1, the width and height of the sub-picture may be determined as one of the values signaled through subpic_cols_width_minus1 and subpic_rows_height_minus1.

As another example, when sps_subpic_same_size_flag is 1, the width and height of the sub-picture included in the row and column of the picture may be determined as sps_subpic_width_minus1[0] and sps_subpic_height_minus1[0].

At this time, num_subpic_columns_minus1 and num_subpic_rows_minus1 may have one of the values of 0 to PicWidthInCtbsY−1 and 0 to PicHeightInCtbsY−1, respectively. Meanwhile, when num_subpic_columns_minus1 and/or num_subpic_rows_minus1 are not signaled, num_subpic_columns_minus1 and/or num_subpic_rows_minus1 may be determined as 0.

In addition, subpic_cols_width_minus1 and subpic_rows_height_minus may have a value of 0 to PicWidthInCtbsY−1 and 0 to PicHeightInCtbsY−1, respectively. Meanwhile, when subpic_cols_width_minus1 and/or subpic_rows_height_minus is not signaled, num_subpic_columns_minus1 and/or num_subpic_rows_minus1 may be determined as PicWidthInCtbsY−1 and/or PicHeightInCtbsY−1, respectively.

At this time, when uniform_subpic_spacing_flag is 1, the total number (NumSubpicsInPic) of sub-pictures included in the picture may be determined based on at least one of the width and height of the picture, num_subpic_columns_minus1 (or subpic_ctu_group_col_minus1), num_subpic_rows_minus1 (or subpic_ctu_group_row_minus1) or log 2_ctu_size_minus5.

In contrast, when uniform_subpic_spacing_flag is 0, the total number (NumSubpicsInPic) of sub-pictures included in the picture may be determined based on at least one of num_subpic_columns_minus1 (or subpic_ctu_group_col_minus1) or subpic_ctu_group_row_minus1 (or num_subpic_rows_minus1).

Meanwhile, when uniform_subpic_flag is not separately signaled, the value thereof may be set to 1.

Meanwhile, each syntax element may be signaled in units of the number of CTUs.

According to another embodiment of the present invention, information indicating whether a sub-picture ID is explicitly signaled may be defined.

For example, information indicating whether the sub-picture ID is explicitly signaled may be defined as syntax elements explicit_subpic_id_flag and sps_subpic_id_mapping_explicitly_signalled_flag.

For example, when explicit_subpic_id_flag is 0, the sub-picture ID may not be separately signaled. In this case, the sub-picture ID of each sub-picture may be determined as a value increasing from 0 by one according to the raster-scan order. For example, subpic_id may be determined based on Equation 3 below.

$$\text{for}\,(i=0;\,i<NumSubpicsInPic,\,i++) \qquad\qquad \text{[Equation 3]}$$

$$subpic\_id[i] = i$$

On the other hand, when explicit_subpic_id_flag is 1, each sub-picture ID may be explicitly signaled according to the raster-scan order.

Meanwhile, the sub-picture ID allocation order is not limited to the raster-scan order, and may be at least one of vertical scan, horizontal scan, diagonal scan or z scan order. The image encoding/decoding apparatus may define a plurality of scan types and any one of them may be selectively used. For example, selection of the scan type may be performed based on signaled information and may be performed based on an encoding parameter. For example, the encoding parameter may include at least one of priority information, a sub-picture size or location or a picture format.

As another example, a syntax element sps_subpic_id_mapping_present_flag indicating whether a sub-picture ID is explicitly signaled in the SPS may be defined. For example, sps_subpic_id_mapping_present_flag may be signaled only when explicit_subpic_id_flag or sps_subpic_id_mapping_explicitly_signalled_flag is 1. When sps_subpic_id_mapping_present_flag is 1, the sub-picture ID may be signaled in the SPS, and, when sps_subpic_id_mapping_present_flag is 0, the sub-picture ID may be signaled at a level other than the SPS. For example, when sps_subpic_id_mapping_present_flagrk is 0, the sub-picture ID may be signaled in a PPS.

Among the syntax elements described in FIG. 9, the syntax elements also described in FIG. 5, FIG. 7 and/or FIG. 8 have the same operations as FIG. 5, FIG. 7 and/or FIG. 8 and thus a detailed description thereof will be omitted.

FIG. 10 is a view illustrating a bitstream structure of an SPS according to another embodiment of the present invention.

According to another embodiment of the present invention, in transmitting sub-picture information, a sub-picture ID may be transmitted in sub-picture units, and some sub-picture information excluding the sub-picture ID may be transmitted based on the CTU information in the sub-picture.

For example, the location of the current sub-picture may be derived for each sub-picture using the location of the top left CTU included in the current sub-picture. For example, the location of the current sub-picture may be determined through signaling of syntax elements sps_subpic_ctu_top_left_x and sps_subpic_ctu_top_left_y respectively indicating the x coordinate and y coordinate of the top left CTU included in the current sub-picture.

As another example, the size of the current sub-picture may be derived using information signaled for each sub-picture. For example, the size of the current sub-picture may be determined through signaling of syntax elements sps_subpic_width_minus1 and sps_subpic_height_minus1 respectively indicating the width and height of the current sub-picture.

The examples described through FIG. 5 and/or FIGS. 7 to 9 are applicable to signaling of the syntax elements excluding the syntax elements sps_subpic_ctu_top_left_x, sps_subpic_ctu_top_left_y, sps_subpic_width_minus1 and sps_subpic_height_minus1, the description of which will be omitted.

FIG. 11 is a view illustrating a bitstream structure of a picture parameter set (PPS) according to another embodiment of the present invention.

According to another embodiment of the present invention, sub-picture information may be signaled through a PPS in tile units.

For example, in transmitting tile information of a current picture through a PPS, all or some of tile partitioning information of a current picture may be derived by referring to sub-picture information signaled by the SPS referred to by a current PPS. The sub-picture information signaled through the PPS may include at least one of the number of subpictures configuring a picture, a size, a location, subpics_present_flag (or sps_subpic_info_present_flag), or sps_subpic_id_mapping_present_flag.

When subpics_present_flag signaled through the PPS is 1, a syntax element subpic_derivation_flag indicating whether a tile is partitioned may be signaled by referring to sub-picture partitioning information transmitted in the SPS.

For example, when the signaled subpic_derivation_flag is 1, a current tile may be partitioned in the same form as the sub-picture partitioning form determined based on the sub-picture information transmitted through the SPS.

In addition, when the signaled subpic_derivation_flag is 1, a syntax element additional_tile_spacing_flag may be signaled, in order to determine whether additional tile partitioning information performed after the tile is partitioned in the same form as the sub-picture partitioning form is signaled.

For example, when additional_tile_spacing_flag is 0, tile partitioning in the same form as the sub-picture partitioning form may be performed without transmitting separate tile partitioning information.

On the other hand, when additional_tile_spacing_flag is 1, tile partitioning in the same form as the sub-picture partitioning form may be performed and additional tile partitioning information may be transmitted to perform additional tile partitioning.

As another example, the current sub-picture may be derived using the tile partitioning information of a previous sub-picture. At this time, information indicating whether to reuse the tile partitioning information of the previous sub-picture may be signaled. As another example, different tile partitioning information may be defined for each sub-pixel or a plurality of sub-pictures may share the same tile partitioning information.

Referring to FIG. 11, a sub-picture ID may be signaled in tile units. At this time, the sub-picture ID may be determined as a value corresponding to the sub-picture ID signaled in the SPS. For example, the tile unit sub-picture ID signaled in the PPS may be determined as a syntax element corresponding_subpic_id, and corresponding_subpic_id[i] may be determined as the same value as subpic_id[i] signaled in the SPS. At this time, i may indicate an i-th tile.

FIG. 12 is a view illustrating a bitstream structure of a PPS according to another embodiment of the present invention.

According to another embodiment of the present invention, sub-picture information may be signaled through a PPS in brick units.

Referring to FIG. 12, a sub-picture ID may be signaled in brick units. At this time, the sub-picture ID may be determined as a value corresponding to the sub-picture ID signaled in the SPS. For example, the brick unit sub-picture ID signaled in the PPS may be determined as a syntax element corresponding_subpic_id, and corresponding_subpic_id[i] may be determined as the same value as subpic_id[i] signaled in the SPS. At this time, i may indicate an i-th tile.

As another example, the sub-picture ID signaled in the PPS may be separately signaled without depending on the sub-picture ID value transmitted in the SPS. For example, a syntax element pps_subpic_id_mapping_present_flag may indicate whether the sub-picture ID is signaled in the PPS. When pps_subpic_id_mapping_present_flag is 1, the sub-picture ID may be signaled in the PPS. When the sps_subpic_id_mapping_explicitly_signalled_flag is 0 or sps_subpic_id_mapping_present_flag is 1, pps_subpic_id_mapping_present_flag may be determined as 0. Meanwhile, the sub-picture ID signaled in the PPS may be defined as a syntax element pps_subpic_id.

FIG. 13 is a view illustrating a bitstream structure of a slice header according to another embodiment of the present invention.

According to another embodiment of the present invention, sub-picture information may be signaled through a slice header.

Referring to FIG. 13, the sub-picture ID may be signaled in a slice header. At this time, the sub-picture ID may be determined as a value corresponding to the sub-picture ID signaled in the SPS or PPS. For example, the sub-picture ID signaled in the slice header may be determined as a syntax element corresponding_subpic_id, and corresponding_subpic_id[i] may be determined as the same value as subpic_id [i] signaled in the SPS or the PPS.

As another example, the sub-picture ID signaled in the slice header may be separately signaled without depending on the sub-picture ID value transmitted in the SPS or the PPS. For example, whether the sub-picture ID is signaled in the slice header may be determined according to sps_sub-pic_info_present_flag. Meanwhile, the sub-picture ID signaled in slice header may be defined as a syntax element sh_subpic_id.

That is, the sub-picture ID may be individually signaled without depending on the sub-picture ID value signaled at different levels. That is, the sub-picture ID may be individually signaled in the SPS, the PPS and/or the slice header.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The present invention may be used to encode or decode an image.

The invention claimed is:

1. An image decoding method comprising:
obtaining sub-picture information from a sequence parameter set (SPS) of a bitstream; and
decoding a current sub-picture based on the sub-picture information,
wherein the sub-picture information includes at least one of a first flag or a second flag,
wherein the first flag indicating whether a sub-picture ID is explicitly signaled,
wherein the second flag indicating whether the sub-picture ID is signaled in the SPS or a picture parameter set (PPS),
wherein, in response to the first flag indicating that the sub-picture ID is not explicitly signaled, the sub-picture ID is not explicitly signaled,
wherein, in response to the first flag indicating that the sub-picture ID is explicitly signaled, the second flag is obtained from the SPS,
wherein, in response to a value of the second flag being 1, the sub-picture ID is signaled from the SPS,
wherein, in response to the value of the second flag being 0, the sub-picture ID is signaled from the PPS, and
wherein the sub-picture information includes a third flag indicating whether sub-pictures included in a current picture have a same size.

2. The image decoding method of claim 1,
wherein, in response to the third flag indicating that the sub-pictures included in the current picture do not have the same size, location information specifying a location of a top left coding tree unit (CTU) of the current sub-picture is signaled from the bitstream, and
wherein, in response to the third flag indicating that the sub-pictures included in the current picture have the same size, the location information is not signaled.

3. The image decoding method of claim 1,
wherein, in response to the third flag indicating that the sub-pictures included in the current picture do not have the same size, size information of the current sub-picture is signaled from the bitstream, and
wherein the size information of the current sub-picture includes width and height information of the current sub-picture.

4. The image decoding method of claim 1, wherein the sub-picture information includes information indicating whether decoding is performed by determining the current sub-picture as a picture.

5. The image decoding method of claim 1, wherein the sub-picture information includes sub-picture filtering information indicating whether to apply filtering to a boundary of the current sub-picture.

6. An image encoding method comprising:
determining sub-picture information based on a current sub-picture; and
encoding the sub-picture information into a sequence parameter set (SPS) of a bitstream,
wherein the sub-picture information includes at least one of a first flag or a second flag,
wherein the first flag indicating whether a sub-picture ID is explicitly signaled,
wherein the second flag indicating whether the sub-picture ID is signaled in the SPS or a picture parameter set (PPS),
wherein, in response to the sub-picture ID being encoded into the SPS, the second flag with a value of 1 is encoded,
wherein, in response to the sub-picture ID being encoded into the PPS, the second flag with a value of 0 is encoded,
wherein, in response to the second flag being encoded, the first flag with a value of 1, indicating that the sub-picture ID is explicitly signaled, is encoded into the SPS,
wherein, in response to the second flag being not encoded, the first flag with a value of 0, indicating that the sub-picture ID is not explicitly signaled, is encoded into the SPS, and
wherein the sub-picture information includes a third flag indicating whether sub-pictures included in a current picture have a same size.

7. A non-transitory computer-readable medium storing a bitstream generated by an encoding method, the method comprising:
- determining sub-picture information based on a current sub-picture; and
- encoding the sub-picture information into a sequence parameter set (SPS) of the bitstream,
- wherein the sub-picture information includes at least one of a first flag or a second flag,
- wherein the first flag indicating whether a sub-picture ID is explicitly signaled,
- wherein the second flag indicating whether the sub-picture ID is signaled in the SPS or a picture parameter set (PPS),
- wherein, in response to the sub-picture ID being encoded into the SPS, the second flag with a value of 1 is encoded,
- wherein, in response to the sub-picture ID being encoded into the PPS, the second flag with a value of 0 is encoded,
- wherein, in response to the second flag being encoded, the first flag with a value of 1, indicating that the sub-picture ID is explicitly signaled, is encoded into the SPS,
- wherein, in response to the second flag being not encoded, the first flag with a value of 0, indicating that the sub-picture ID is not explicitly signaled, is encoded into the SPS, and
- wherein the sub-picture information includes a third flag indicating whether sub-pictures included in a current picture have a same size.

* * * * *